United States Patent [19]

Fairey

[11] Patent Number: 4,643,091

[45] Date of Patent: Feb. 17, 1987

[54] ELECTROMAGNETIC CLUTCH-BRAKE POSITIONING ASSEMBLY

[75] Inventor: Brian M. Fairey, Waterloo, Canada

[73] Assignee: NCR Corporation, Dayton, Ohio

[21] Appl. No.: 801,651

[22] Filed: Nov. 25, 1985

[51] Int. Cl.[4] .................. B41F 33/08; B41F 13/12; B41F 21/00

[52] U.S. Cl. .................... 101/233; 192/18 B

[58] Field of Search ............. 101/232, 233, 234, 235, 101/242, 91; 192/18 A, 18 B, 12 D, 84 C, 84 AB, 84 P, 84 B, 84 A, 9, 84 AA, 48.2; 318/362, 365-371; 310/76-78, 94, 23

[56] References Cited

U.S. PATENT DOCUMENTS

| | | | |
|---|---|---|---|
| 2,924,314 | 2/1960 | Shepard, Jr. ................. | 192/18 B |
| 3,167,673 | 1/1965 | Miquel et al. ................. | 310/93 |
| 3,390,746 | 7/1968 | Becker et al. ................. | 192/18 B |
| 3,438,323 | 4/1969 | Smitzer et al. ................. | 101/233 |
| 3,446,322 | 5/1969 | Wrensch ................. | 192/18 |
| 3,487,438 | 12/1969 | Becker et al. ................. | 192/18 |
| 3,590,969 | 7/1971 | Kasitani ................. | 192/18 B |
| 3,795,190 | 3/1974 | Wallace ................. | 101/233 |
| 3,893,191 | 7/1975 | Gold et al. ................. | 310/76 |
| 3,945,476 | 3/1976 | de Jong ................. | 192/12 |
| 3,978,948 | 9/1976 | Baer ................. | 192/18 B |
| 4,172,985 | 10/1979 | Meier ................. | 310/74 |
| 4,387,794 | 6/1983 | Schneider et al. ................. | 192/18 B |
| 4,429,773 | 2/1984 | Dohi et al. ................. | 192/18 B |
| 4,552,065 | 11/1985 | Billington ................. | 101/233 |

Primary Examiner—J. Reed Fisher
Attorney, Agent, or Firm—Wilbert Hawk, Jr.; Albert L. Sessler, Jr.; Elmer Wargo

[57] ABSTRACT

An electromagnetic, clutch-brake, positioning assembly is shown in an endorsing or printing environment which requires precise positional control. The assembly has an output shaft and a second output member which is an output gear which is located close to a rotary input member. The assembly also includes a feedback system which monitors the wear of an associated brake pad in the assembly to adjust the energization of the associated electromagnetic clutch and braking coils to maintain accurate positional control.

12 Claims, 3 Drawing Figures

ELECTROMAGNETIC CLUTCH-BRAKE POSITIONING ASSEMBLY

BACKGROUND OF THE INVENTION

This invention relates generally to an electromagnetic, clutch-brake, positioning assembly for use in applications which require precise, positional control, and in particular, it relates to such an assembly which is able to adjust automatically for wear in a brake pad associated with the assembly to thereby maintain such precise positional control.

One of the problems with prior-art, clutch-brake assemblies is that they do not maintain precise positional control when used extensively over a period of time. For example, a "wrap-spring clutch" may be used typically in an endorser which, in turn, is used in financial systems. One of the functions which an endorser performs is to print the name of the bank or financial institution which processes the documents on the back of each document, like a check which is processed by the bank. In the endorsing process mentioned, the wrap-spring clutch is used to position the printing drum of a drum-type endorser to "roll" the information on the back of a document in the correct position on the document moving along a document track associated with the endorser. This rolling-on of information occurs in less than one complete revolution of the printing drum, and before the revolution is completed, the printing drum has to be stopped in the correct location so as to position it for the next document being moved in the document track. When the wrap-spring clutch mentioned is used for a period of time, it loses its positional control.

SUMMARY OF THE INVENTION

In contrast with the wrap-spring clutch mentioned, the, clutch-brake, positioning assembly of this invention includes a feedback system which monitors the wear of a certain element in the assembly to thereby adjust the energization and de-energization of certain electromagnetic coils associated with the assembly to maintain an accurate, positional control with the assembly.

A preferred embodiment of this invention comprises: a frame having first and second ends; a shaft having an output portion near said second end; mounting means for rotatably mounting said shaft in said frame and for restraining said shaft against axial movement therein; input means near said first end for supplying rotary motion to said assembly; a first rotatable member fixed to said shaft to rotate therewith and having a friction area facing said first end; a first motion transfer member mounted in said input means to rotate therewith and to be moveable axially along said shaft; a first electromagnetic coil mounted in said assembly to attract said first motion transfer member to said friction area of said first rotatable member when said first electromagnetic coil is energized to thereby transfer rotary motion from said input means to said shaft.

The preferred embodiment also includes: a second rotatable member mounted on said shaft to rotate therewith and to be moveable axially along said shaft; a brake member fixed in said assembly and facing said second rotatable member; means for biasing said second rotatable member axially away from said brake member; a second electromagnetic coil mounted in said assembly to attract said second rotatable member to said brake member when said second electromagnetic coil is energized to thereby brake said shaft; and control means for controlling the rotational position of said shaft relative to a reference point by controlling the energization and de-energization of said first and second electromagnetic coils.

The control means includes: detector means which are operatively coupled to said second rotatable member to detect its position in relation to said reference point and to produce at least one positional signal in accordance therewith; and circuit means responsive to said at least one positional signal to adjust the energization and de-energization of said first and second magnetic coils to control the rotational position of said shaft relative to said reference point.

This invention is simple and inexpensive to produce, and it also provides for accurate positioning of a rotating member. These advantages and others will be more readily understood in connection with the following description, claims and drawing.

DETAILED DESCRIPTION OF THE INVENTION

Figure 1:
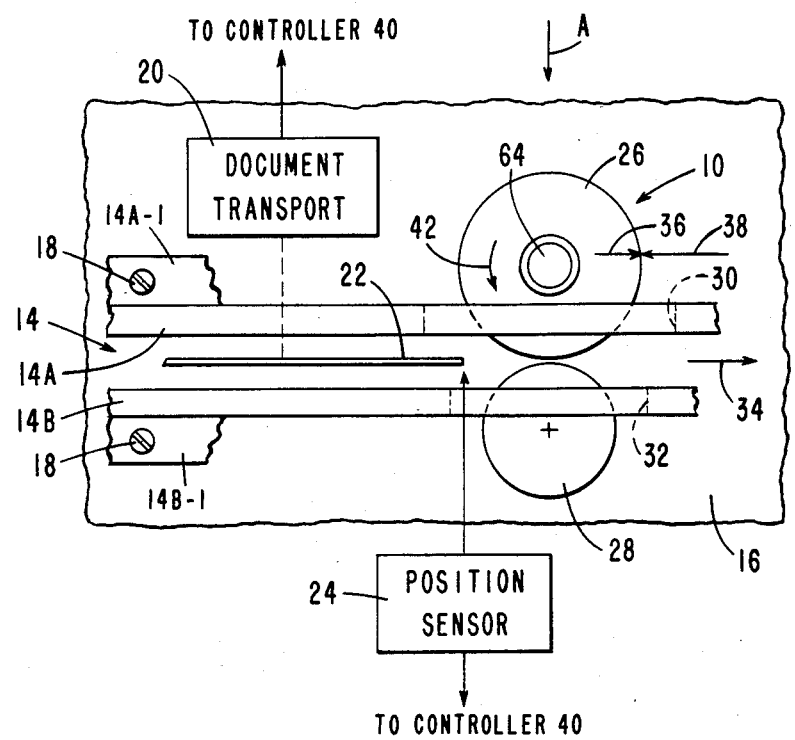
FIG. 1 is a plan view, in diagrammatic form, showing a document in a document track and approaching an endorsing station where an endorser using the electromagnetic, clutch-brake positioning assembly of this invention is utilized.
Figure 2:
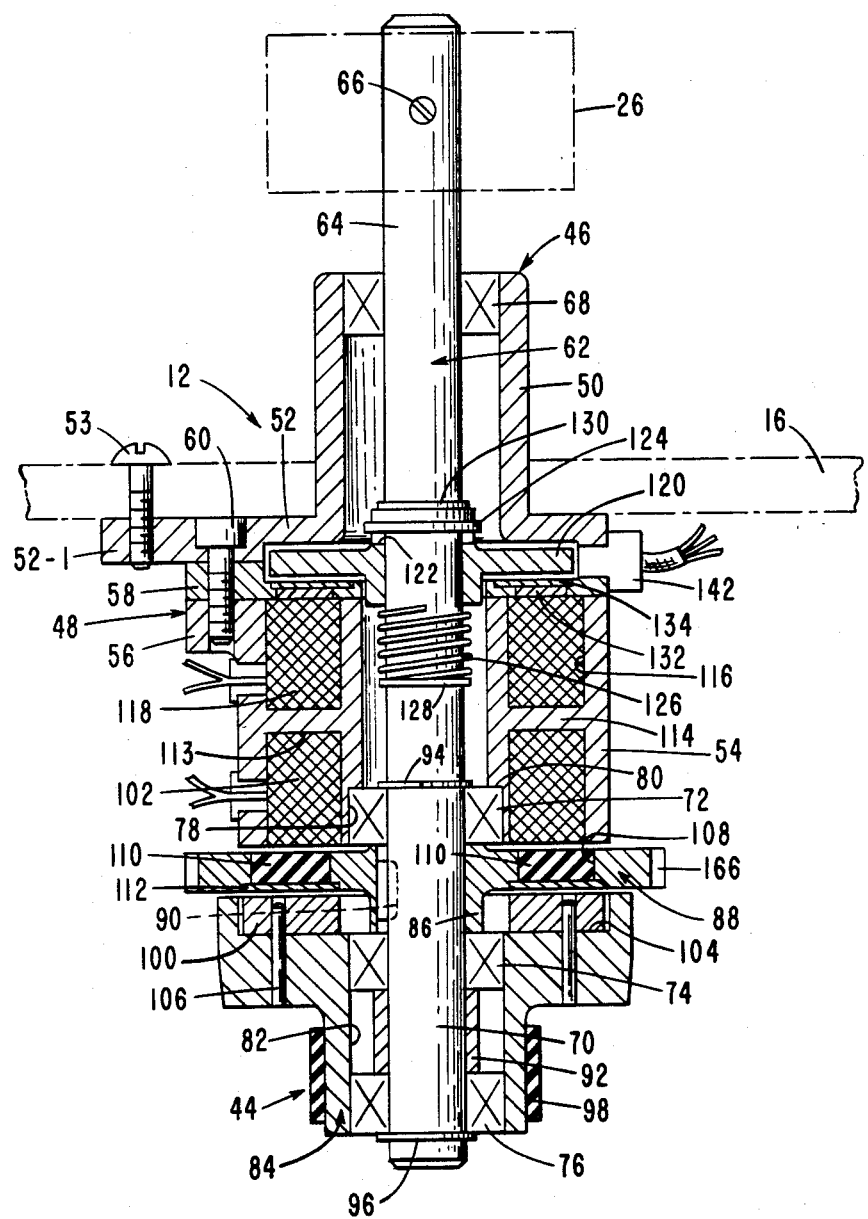
FIG. 2 is an elevational view, partly in cross section, of the clutch-brake positioning assembly used in the endorsing station shown in FIG. 1.

FIG. 1 shows a plan view of an endorsing station 10 in which the electromagnetic, clutch-brake, positioning assembly, hereinafter referred to as assembly 12 (FIG. 2), may be used. The endorsing station 10 includes a document track 14 having spacedapart side walls 14A and 14B (and mounting flanges 14A-1 and 14B-1, respectively) which are upstanding from and secured to a horizontally-positioned base plate 16 by fasteners 18. Documents are fed in the document track 14 to the endorsing station 10 by a conventional document moving or transport mechanism shown only schematically as document transport 20 in FIG. 1. Only a portion of the top, long side of a document 22 is shown in FIG. 1, with the leading edge of the document 22 approaching a position sensor 24. As alluded to earlier herein, the documents 22 may be checks, for example, which are endorsed or printed on the backs thereof by a conventional endorsing drum or wheel 26 which is positioned to roll the endorsing information on the backs of the checks as the documents 22 are moved between the endorsing wheel 26 and its associated pinch roller 28. The endorsing wheel 26 is intermittently driven by the assembly 12 (FIG. 2). The wall 14A has an opening 30 (FIG. 1) therein to permit the periphery of the endorsing wheel 26 to pass therethrough to engage the document 22, and similarly, the wall 14B has an opening 32 therein to enable the pinch roller 28 to engage the document 22 and move it in conjunction with endorsing wheel 26 in a downstream direction along the direction of arrow 34.

Figure 3:
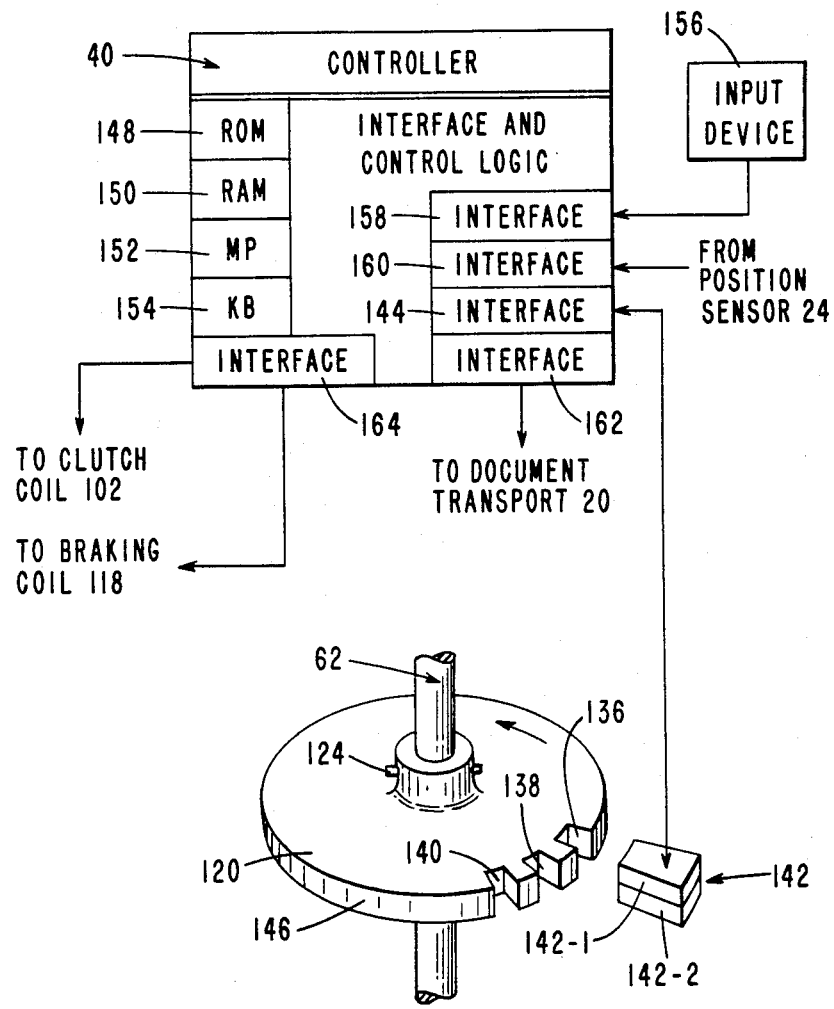
FIG. 3 is a schematic view of a controller used with the clutch-brake, positioning assembly.

As stated earlier herein, it is necessary that the positioning assembly 12 be positioned accurately so as to endorse or print information on the backs of the documents 22. In this regard, when the endorsing wheel 26 is positioned properly, an arrow 36 (FIG. 1) on the endorsing wheel 26 is aligned with a reference point (shown only schematically as arrow 38). As a document 22 is moved towards the endorsing station 10 by the document transport 20, the leading edge of the document 22 is detected by the position sensor 24 which sends an output to the controller 40 (FIG. 3). The controller 40 then actuates the positioning assembly 12 (as will be described hereinafter) to rotate the endorsing wheel 26 in the direction of arrow 42 to endorse or print the information on the back of the document 22. Thereafter, the controller 40 "stops" the positioning assembly 12 so that the arrow 36 is aligned with the arrow 38 in readiness for the next document 22 approaching the endorsing station 10.

The positioning assembly 12 is shown in cross section in FIG. 2, with the plane of cross section passing through the center of the assembly 12. The assembly 12 has a first or input end 44 and a second or output end 46. The assembly 12 includes a frame 48 which is comprised of a first cylindrical portion 50 having a flange 52 extending therefrom, a second cylindrical portion 54 also having a flange 56 extending therefrom, and a braking plate or member 58 positioned between the first and second cylindrical portions 50 and 54 as shown. A fastener 60 is used to secure together the first and second cylindrical portion 50 and 54 and the braking member 58; two other fasteners 60 and flanges 52 and 56 (not shown) which are spaced 120 degrees from the fastener 53 shown (along the periphery of the flange 52) are used similarly to provide a secure frame 48. The flange 52 has several extensions, like extension 52-1, which enable the assembly 12 to be secured to the lower side of base plate 16, by fasteners, like 53, with the base plate 16 and the fasteners 53 being shown in phantom outline in FIG. 2.

The positioning assembly 12 (FIG. 2) also incudes a shaft 62 having an output portion 64 to which the endorsing wheel 26 is secured by a fastener 66. The output portion 64 of the shaft 62 is rotatably mounted in ball bearing 68 which is retained in the first cylindrical portion 50. The input portion 70 of the shaft 62 is rotatably mounted in ball bearings 72, 74, and 76. Bearing 72 is mounted in an annular recess 78 in the second cylindrical portion 54 (and press-fitted therein) and abuts against a shoulder 80 in the recess 78. Bearing 74 is mounted inside the cylindrical recess 82 of an input member 84 and abuts against a tubular neck portion 86 which is part of a first rotatable member 88 which is keyed to shaft 62 at area 90 to enable the first rotatable member 88 to rotate the shaft 62 as will be described hereinafter. A tubular spacer 92 is positioned between the bearings 74 and 76 as shown. A "C"-type washer 94 fitting into a mating recess (not shown) on the shaft 62 and a "C"-type washer 96 fitting into a mating recess (not shown) on the shaft 62 are used to keep the input member 84, the tubular spacer 92, and the first rotatable member 88 in the assembled relationship shown.

As shown in FIG. 2, the input member 84 is rotatably mounted on the bearings 74 and 76, and a driving belt 98 is mounted on the input member 84 to rotate it at a constant velocity in the direction of arrow 42 in FIG. 1. The belt 98 is driven by a motor (not shown) which is part of the document transport 20. The rotary motion of the input member 84 is transferred to the shaft 62 by the motion-transfer member 100, the first rotatable member 88 and an electromagnetic clutch coil 102 which is energized and de-energized by the controller 40 (FIG. 3) as will be described hereinafter.

The motion-transfer member 100 (FIG. 2) is a thick, washer-like, ferrous member which fits into a mating recess 104 in the input member 84. The member 100 has a plurality of radially-aligned holes therein to slidably receive the similarly-aligned pins 106 which are press fitted into the input member 84 to be retained therein. By this construction, the member 100 rotates with the input member 84; however, it is free to slide on the pins 106 in an axial direction relative to shaft 62.

The first rotatable member 88 (FIG. 2) is made of ferrous material, and it has a plurality of radially-aligned holes 108 therein which are filled with non-magnetic plastic material 110. An annular or washer-type friction area or pad 112 is positioned in an annular recess in the first rotatable member 88 to face the motion transfer member 100. The friction pad 112 is made of cork material, for example, and is at least as large as the motion-transfer member 100 to coact therewith. When in the inoperative position shown in FIG. 2, there is a slight clearance between the friction pad 112 and the motion-transfer member 100 so as to minimize wear on the friction pad 112 and to prevent unwanted coupling.

The clutch coil 102 (FIG. 2), alluded to earlier herein, is positioned in a first annular recess 113 in the second cylindrical portion 54 which has a divider 114 separating a second annular recess 116 from the first annular recess 113. An electromagnetic braking coil 118 is positioned in the annular recess 116. The clutch coil 102 and the braking coil 118 are controlled by the controller 40 as will be described hereinafter.

The positioning assembly 12 (FIG. 2) includes a second, rotatable member or a rotatable, braking member 120 which is made of ferrous material. The rotatable, braking member 120 has a hub portion having a diametrically-aligned, elongated recess 122 therein in which a pin 124 is mounted. The pin 124 is diametrically located in the shaft 62 and press fitted therein to transfer rotary motion from the shaft 62 to the rotatable, braking member 120 while permitting the braking member 120 to move axially with reference to shaft 62. The rotatable, braking member 120 is biased to move away from the stationary braking member 58, alluded to earlier herein, by a compression-type spring 126 which surrounds the shaft 62. One end of the spring 126 contacts a "C"-type washer 128 which fits into a mating recess in the shaft 62, and the other end of the spring 126 pushes the rotatable, braking member 120 away from the stationary braking member 58. A "C"-type washer 130 limits the movement of the rotatable, braking member 120 in the upward direction as viewed in FIG. 2.

The stationary, braking member 58 (FIG. 2) has a plurality of radially aligned holes 132 therein which are filled with a non-ferrous plastic material. The side of the stationary braking member 58 which faces the underside (as viewed in FIG. 2) of the moveable, braking member 120 has an annular recess therein which receives an annular or a washer-type braking pad 134. When the braking coil 118 is energized, the moveable braking member 120 is attracted, magnetically, causing it to move axially against the bias of spring 126 towards and against the braking pad 134 to stop the rotation of shaft 62.

The rotatable, braking member 120 (FIG. 2) has a plurality of notches 136, 138, and 140 (FIG. 3) for example, which coact with a sensor designated generally as 142. Basically, the sensor 142 is used to detect the amount of "overshoot" which may occur in stopping the endorsing wheel 26 relative to the reference arrow 38 (FIG. 1), with the "overshoot" being due to wear in braking pad 134. The notches 136, 138, and 140 are shown in exaggerated size in FIG. 3. The associated sensor 142 is comprised of a light-emitting diode (LED) 142-1 and an associated, light detector 142-2. Light from the LED 142-1 is reflected from the base of the notch, like 136, for example, and is reflected back to the detector 142-2 which sends an output signal to the controller 40 via the interface 144 which may include conventional drivers (not shown). The periphery 146 of the rotatable, braking member 120 is non-reflective except for the areas of the notches 136, 138, and 140.

The controller 40 (FIG. 3), alluded to earlier herein, includes a read only memory (ROM) 148, a random access memory (RAM) 150, a microprocessor (MP) 152, and a keyboard (KB) 154 for entering data into the controller. Alternatively, data may be entered into the controller 40 by an input device 156 (like a cassette player) via the interface 158. The controller 40 also has a plurality of conventional interfaces 160, 162, and 164 to couple the various elements discussed (like clutch coil 102, and sensors 24 and 142) to the controller 40. The various elements included in the controller 40 are interconnected by conventional interface and control logic 166 to enable the controller 40 to function as an intelligent controller. The interfaces 162 and 164 contain conventional drivers (not shown) to drive the clutch and braking coils 102 and 118, respectively.

Having described the various elements of the endorsing station 10 and the positioning assembly 12, it appears appropriate to discuss their functioning. In this regard, when the leading edge of a document 22 approaches the position sensor 24 (FIG. 1), the sensor 24 sends a signal to the controller 40, which in turn, energizes the clutch coil 102 (FIG. 2) at an appropriate time, taking into consideration, the velocity of the document 22 and the reaction time for assembly 12 to react, for example. When the clutch coil 102 is energized, the magnetic lines of force pass through the plastic material 110 and attract the motion-transfer member 100, pulling it axially along the pins 106 into frictional engagement with the friction pad 112 to transfer the rotary motion of the input member 84 to the first, rotatable member 88 and thereby transfer this rotary motion to the shaft 62. As the shaft 62 rotates, it rotates the endorsing wheel 26 to print the information on the back of the document 22 as previously explained. The controller 40 has an appropriate program stored in its ROM 148 or loaded daily into its RAM 150 to control the energizing and de-energizing of the clutch coil 102 and the braking coil 118. After a predetermined amount of elapsed time from the energizing of the clutch coil 102, the clutch coil 102 is de-energized, and the braking coil 118 is energized. The elapsed time mentioned is determined, conventionally, by the rotational velocity of shaft 62 and the diameter of the endorsing wheel 26 which also feeds the document 22 along the document track 24 as it prints the information thereon. When the clutch coil 102 is deenergized, the coupling between the first rotatable member 88 and the motion-transfer member 100 is interrupted or broken due to the member 100 falling away axially, (due to gravity) from the friction pad 112. If found necessary or desireable, an additional spring (not shown) may be used to bias the motion-transfer member 100 to the home position shown in FIG. 2. When the braking coil 118 is energized, the magnetic lines of force from the coil 118 pull the rotatable, braking member 120 downwardly (as viewed in FIG. 2) into engagement with the annular, braking pad 134 to decelerate the shaft 62 with the endorsing wheel 26 thereon, stopping it in alignment with the arrow 38, (FIG. 1) as previously explained. When the positioning device 12 is working properly and accurately, an output from the sensor 142 in association with notch 136 (FIG. 3) indicates to the controller 40 that the endorsing wheel 26 is properly positioned (FIG. 1) to begin the endorsing operation as described for the next document 22 entering the endorsing station 10.

As the braking pad 134 (FIG. 2) begins to wear, it is not as effective in accurately controlling the positioning of the endorsing wheel 26 relative to arrow 38, for example, as when the pad 134 is new. As a result, the rotatable braking member 120 begins to "overshoot" as alluded to earlier herein. When this occurs, a second signal as derived from notch 138 will be received by the controller 40 in addition to the usual one received as derived from notch 136. The second signal (derived from the notch 138) is used by the controller 40 to initiate the de-energization of the clutch coil 102 and the energization of the braking coil 118 (for a subsequent endorsing cycle) at a point earlier in time when compared to the normal time when the braking pad 134 is new or not worn. The third notch 140 and its associated signal may be used, similarly, for extensive overshooting.

In the embodiment described, the time for rotating the endorsing wheel 26 through a complete endorsing cycle or revolution is about 50 milliseconds. The clutch coil 102 is de-energized, normally, about 36 milliseconds after the start of a cycle by which time the endorsing wheel 26 has rotated through an angle of less than about 270 degrees. The braking coil 118 is energized after about 37 milliseconds from the start of a cycle and is deenergized at about 50 milliseconds from the start of a cycle. The braking of the endorsing wheel 26 takes place over an angle of approximately ninety degrees from an angle of about 270 degrees to 360 degrees during one complete revolution of the endorsing wheel 26. When the second signal (derived from notch 138) is received by the controller 40, the controller 40 will use that signal to initiate the de-energization of the clutch coil 102 at about 35 milliseconds from the start of a cycle and the energization of the braking coil 118 at about 35 milliseconds from the start of a cycle for the next endorsing cycle instead of the usual 37 milliseconds. Naturally, the various speeds, times and angles given are given simply as illustrative parameters, and the actual parameters selected will depend upon the actual braking materials used and the physical dimensions of the various components described.

In addition to the features already described, another feature of this invention is that the construction thereof enables the first, rotatable member 88 to function as an output member when gear teeth 166 (FIG. 2) are formed on the periphery of the member 88. This enables the assembly 12 to have two output members, namely shaft 62 and the gear teeth 166. Having the output member (gear teeth 166) close to the input member 84 is useful in some applications.

What is claimed is:
1. A positioning assembly comprising:
a frame having first and second ends;
a shaft having an output portion near said second end;

mounting means for rotatably mounting said shaft in said frame and for restraining said shaft against axial movement therein;

input means located near said first end for supplying rotary motion to said assembly;

a first rotatable member fixed to said shaft to rotate therewith and having a friction area facing said first end;

a motion transfer member mounted in said input means to rotate therewith and to be moveable axially along said shaft;

a first electromagnetic coil mounted in said assembly to attract said motion transfer member to said friction area of said first rotatable member when said first electromagnetic coil is energized to thereby transfer rotary motion from said input means to said shaft;

a second rotatable member mounted on said shaft to rotate therewith and to be moveable axially along said shaft;

a brake member fixed in said assembly and facing said second rotatable member;

means for biasing said second rotatable member axially away from said brake member;

a second electromagnetic coil mounted in said assembly to attract said second rotatable member to said brake member when said second electromagnetic coil is energized to thereby brake said shaft; and control means for controlling the rotational position of said shaft relative to a reference point by controlling the energization and de-energization of said first and second electromagnetic coils;

said control means including:

detector means which are operatively coupled to said second rotatable member to detect its position in relation to said reference point and to produce at least one positional signal in accordance therewith; and circuit means responsive to said at least one positional signal to adjust the energization and de-energization of said first and second magnetic coils to control the rotational position of said shaft relative to said reference point.

2. The positioning assembly as claimed in claim 1 in which said first rotatable member has gear teeth located on the periphery thereof to function as an output member from said positioning assembly.

3. The positioning assembly as claimed in claim 1 in which said input means comprises an input member and means for rotatably supporting said input member on said shaft;

said input member having an annular recess therein to receive said motion transfer member which is annular shape and which has a plurality of radially-aligned holes therein;

said input member having a plurality of pins mounted therein for alignment with said radially-aligned holes in said motion transfer member to enable said motion transfer member to rotate with said input member and to be moveable axially relative to said shaft.

4. The positioning assembly as claimed in claim 1 in which said friction area on said first rotatable member is annular in shape and is secured to said first rotatable member so as to be aligned with said motion transfer member.

5. The positioning assembly as claimed in claim 4 in which said first rotatable member has gear teeth located on the periphery thereof to function as an output member from said positioning assembly.

6. The positioning assembly as claimed in claim 5 in which said first rotatable member is made of metal and is positioned between said input means and said first electromagnetic coil;

said first rotatable member having a plurality of radially-aligned holes therein with non-ferrous material filling said holes to facilitate said first electromagnetic coil in attracting said first motion transfer member to said friction area of said first rotatable member.

7. The positioning assembly as claimed in claim 6 in which said brake member is positioned between said second rotatable member and said second electromagnetic coil, and in which said brake member has an annular brake pad thereon to coact with said second rotatable member when said second electromagnetic coil is energized.

8. The positioning assembly as claimed in claim 1 in which said second rotatable member has at least first and second notches therein which bear a relationship to said reference point; said detector means being effective to produce a first said positional signal and a second said positional signal in cooperation with said first and second notches, respectively;

said circuit means being responsive to said second positional signal to cause the de-energization of said first electromagnetic coil and the energization of said second electromagnetic coil to occur at a point in time which is sooner than the de-energization of said first electromagnetic coil and the energization of said second electromagnetic coil which occur in response to said first positional signal.

9. The positioning assembly as claimed in claim 8 in which said first rotatable member has gear teeth located on the periphery thereof to function as an output member from said positioning assembly.

10. An endorsing assembly comprising:

a document track having an endorsing station positioned therealong;

a positioning assembly having an output shaft;

an endorsing drum secured to said output shaft;

a pinch roller;

said positioning assembly, endorsing drum and pinch roller being positioned at said endorsing station to endorse documents moving in said document track between said endorsing drum and said pinch roller;

means for moving said documents in said document track to said endorsing station; and a position sensor for producing an output signal upon detecting a leading edge of a said document approaching said endorsing station;

said positioning assembly comprising:

a frame having first and second ends;

said output shaft having an output portion near said second end;

mounting means for rotatably mounting said output shaft in said frame and for restraining said output shaft against axial movement therein;

input means near said first end for supplying rotary motion to said assembly;

a first rotatable member fixed to said output shaft to rotate therewith and having a friction area facing said first end;

a motion transfer member mounted in said input means to rotate therewith and to be moveable axially along said output shaft;

a first electromagnetic coil mounted in said assembly to attract said motion transfer member to said friction area of said first rotatable member when said first electromagnetic coil is energized to thereby transfer rotary motion from said input means to said output shaft;

a second rotatable member mounted on said output shaft to rotate therewith and to be moveable axially along said output shaft;

a brake member fixed in said assembly and facing said second rotatable member;

means for biasing said second rotatable member axially away from said brake member;

a second electromagnetic coil mounted in said assembly to attract said second rotatable member to said brake member when said second electromagnetic coil is energized to thereby brake said output shaft; and control means for receiving said output signal and for controlling the rotational position of said output shaft relative to a reference point at said endorsing station by controlling the energization and de-energization of said first and second electromagnetic coils;

said control means including:

detector means which are operatively coupled to said second rotatable member to detect its position in relation to said reference point and to produce at least one positional signal in accordance therewith; and circuit means responsive to said at least one positional signal to adjust the energization and de-energization of said first and second magnetic coils to control the rotational position of said output shaft relative to said reference point for a next said document approaching said endorsing station.

11. The endorsing assembly as claimed in claim 10 in which said first rotatable member has gear teeth located on the periphery thereof to function as an output member from said positioning assembly.

12. The endorsing assembly as claimed in claim 11 in which said second rotatable member has at least first and second notches therein which bear a relationship to said reference point; said detector means being effective to produce a first said positional signal and a second said positional signal in cooperation with said first and second notches, respectively; and said circuit means being responsive to said second positional signal to cause the deenergization of said first electromagnetic coil and the energization of said second electromagnetic coil to occur at a point in time which is sooner than the de-energization of said first electromagnetic coil and the energization of said second electromagnetic coil which occur in response to said first positional signal.

* * * * *